W. A. Estes.
Harrow.
No. 93,187. Patented Aug. 3, 1869.
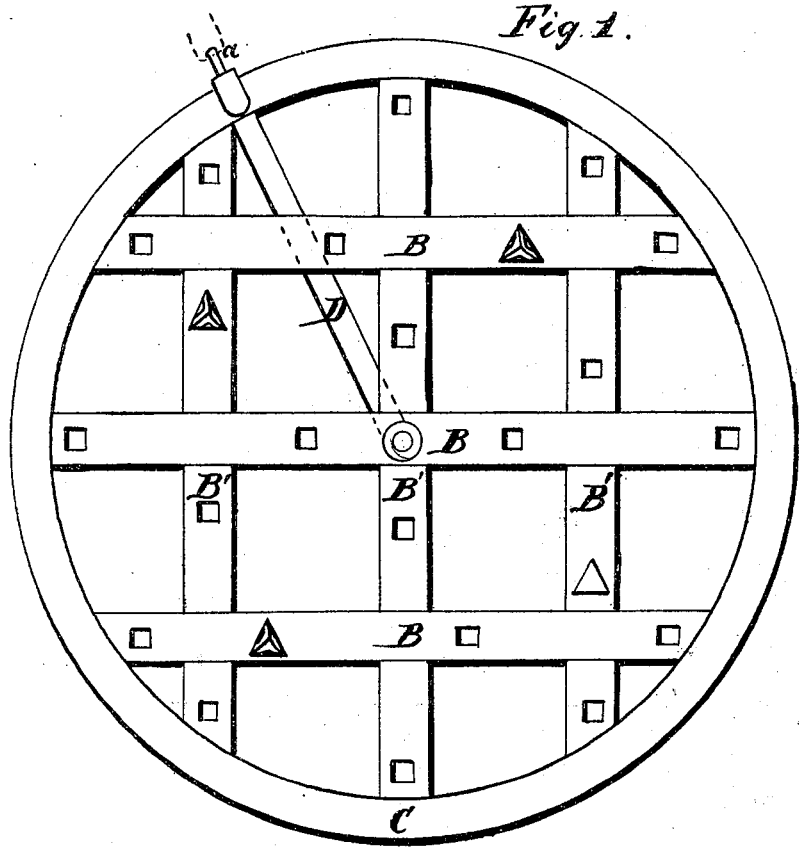
Fig. 1.
Fig. 3.
Fig. 4.
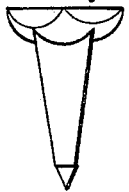
Fig. 2.
Witnesses
Phil. F. Lamer
Thu. Rothwell
Inventor
Wm. A. Estes
By Geo. W. Rothwell
Atty

United States Patent Office.

WILLIAM A. ESTES, OF CHINA, ASSIGNOR TO R. M. MANSUR, OF AUGUSTA, MAINE.

Letters Patent No. 93,187, dated August 3, 1869.

IMPROVEMENT IN HARROWS AND CULTIVATORS.

The Schedule referred to in these Letters Patent and making part of the same.

*To all whom it may concern:*

Be it known that I, WILLIAM A. ESTES, of China, in the county of Kennebec, and State of Maine, have invented certain new and useful Improvements in Harrows; and I do hereby declare the following to be a full, clear, and exact description thereof, sufficient to enable those skilled in the art to which my invention appertains, to fully understand and make and use the same, reference being had to the accompanying drawings, forming part of this specification, and in which—

Figure 1 is an inverted plan view of my harrow.

Figures 3, 4, and 5, are views of teeth detached.

My invention consists in a peculiar construction of the teeth, and in the general construction, arrangement, and combination of parts, as hereinafter set forth.

In the drawings, the frame of my harrow is represented as composed of beams B B B and B' B' B', crossed at right angles, and let into each other at the intersections.

An annular metallic plate is secured on top the beams B B', at their outer ends, and a similar plate, C, is also preferably attached on the under side.

By this construction, a frame is produced which is much cheaper and more durable than the ordinary frames of rotary harrows, which consist of radial arms set in a hub.

My frame also possesses another advantage over the ordinary kind, which is this: increased space for the application of teeth, permitting them to be set in irregular lines, or so that they will not follow each other, thus effecting a more general pulverization of the soil.

The teeth are made tapering, as shown in figs. 2 and 4, and triangular in their cross-section, as represented in fig. 3. The faces of the teeth are hollowed out, as represented. It is not necessary that these depressions be concavities, as in fig. 3, for other forms, as angular, will accomplish the same result, which is to sharpen or elongate the corners of the teeth, whereby the clods of earth are more readily and perfectly broken.

The teeth may be formed, as in fig. 2, with shanks, which are fitted into holes of corresponding form in the frame of the harrow; or they may be made with a flange, as in figs. 3 and 4, having holes, through which bolts may be driven into the frame of the harrow.

The draught-attachment consists of a metallic bar, D, turning on a pin in the centre of the harrow-frame. The outer portion of this bar is bent down, and the extreme end is bent back, underneath the frame of the harrow, to prevent the bar from rising.

$a$ is an eye, fixed in the outer part of the bar D, for the attachment of the draught-chain.

The advantages of my harrow, besides breaking the soil to an unusually fine state, are these: it will not clog or hitch against obstructions of any kind, but will revolve around the same; it does not require to be dragged around corners in turning; the ready mode of applying the teeth, which are to be made of cast-metal.

I do not claim as new the construction of the frame and draught-attachment, as above described; neither do I claim broadly the teeth, made triangular in their cross-section, and with concave sides, in view of the patent to D. M. Cumming, dated November 22, 1859; but having thus described my invention,

What I claim as new, and desire to secure by Letters Patent, is—

1. The triangular-pointed teeth, when provided with a shank or perforated plate, for independent attachment to the harrow-frame, as specified.

2. The harrow herein described, composed of the frame B B' C, detachable teeth, fig. 2 or 4, and the draught-bar D, all as set forth.

In testimony that I claim the above, I have hereunto subscribed my name, in presence of two witnesses.

WILLIAM A. ESTES.

Witnesses:
GRANVILLE MANSUR,
E. N. WATERS.